Figure 24:
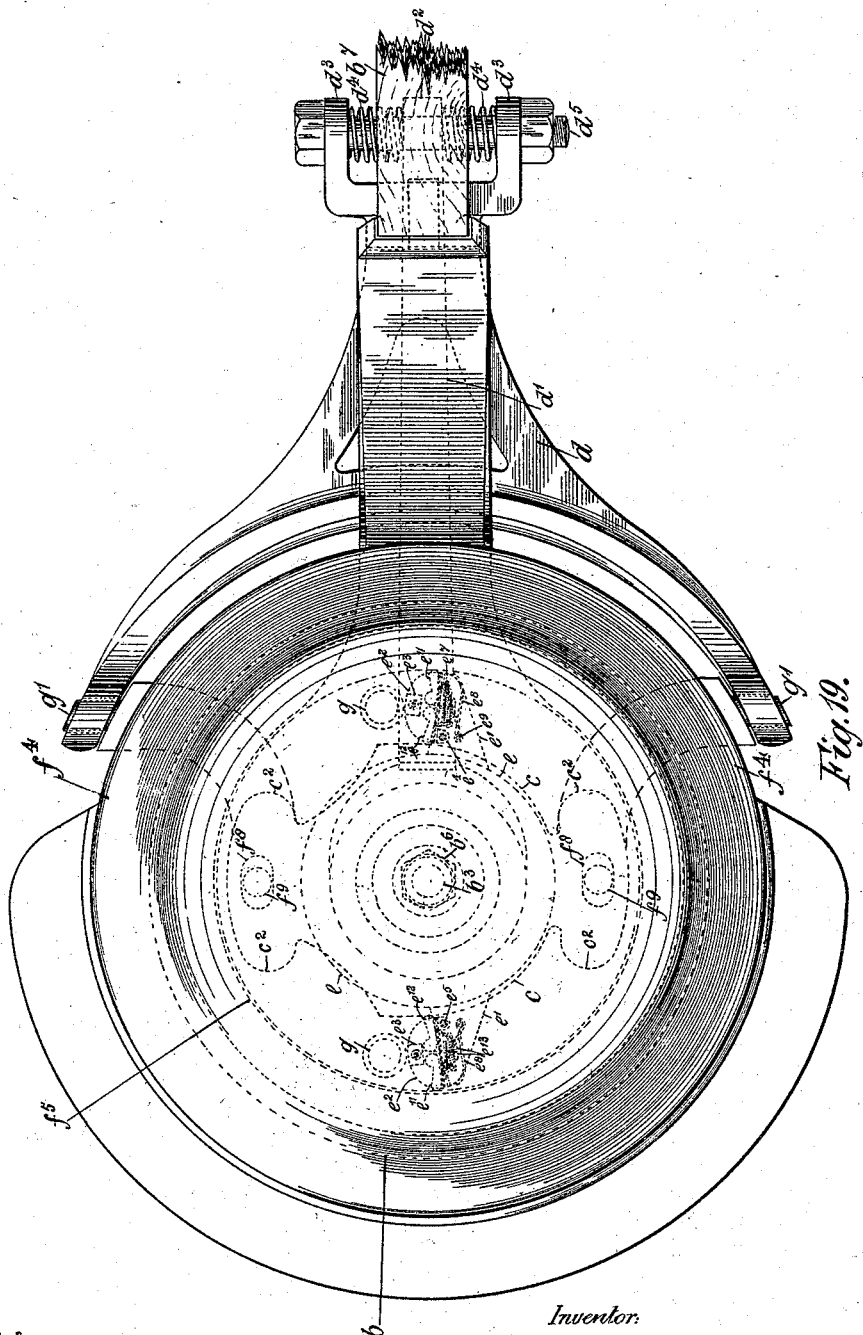

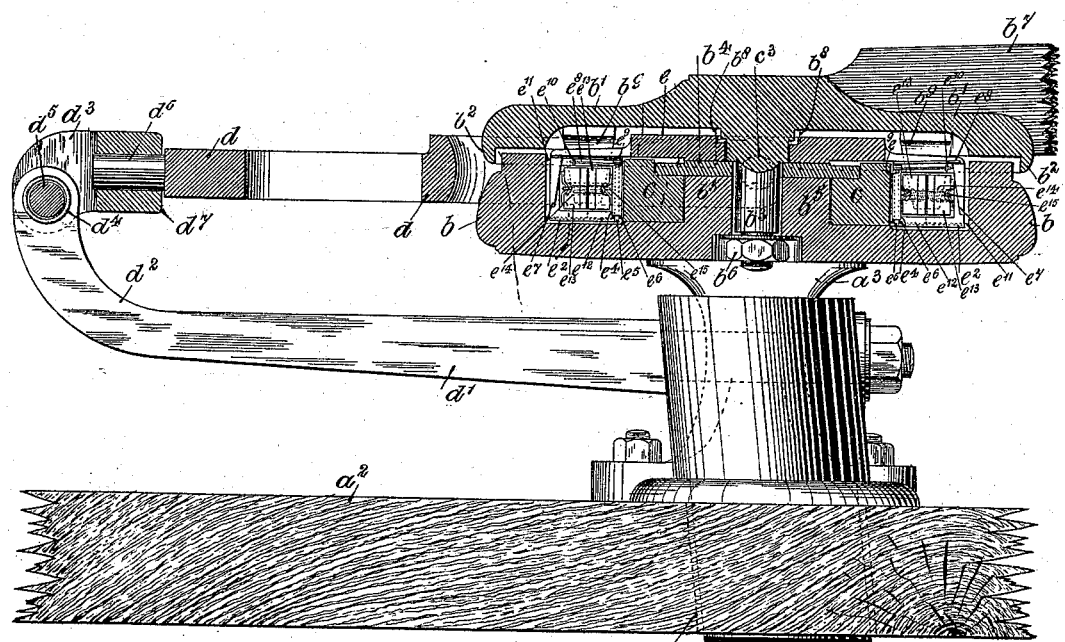

(No Model.) 6 Sheets—Sheet 2.
G. AZZERONI.
STEERING GEAR.
No. 547,317. Patented Oct. 1, 1895.
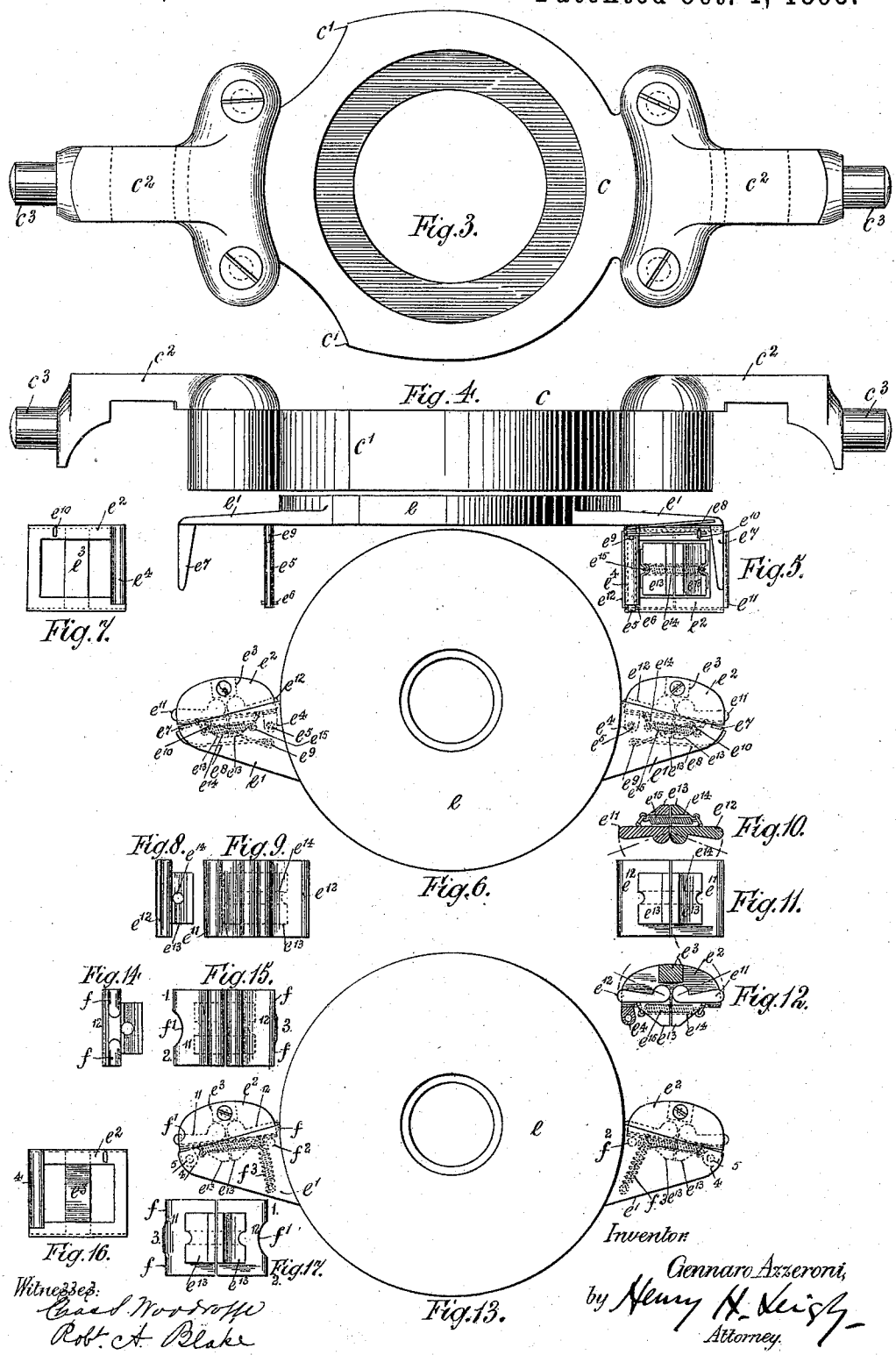

(No Model.) 6 Sheets—Sheet 3.
G. AZZERONI.
STEERING GEAR.
No. 547,317. Patented Oct. 1, 1895.
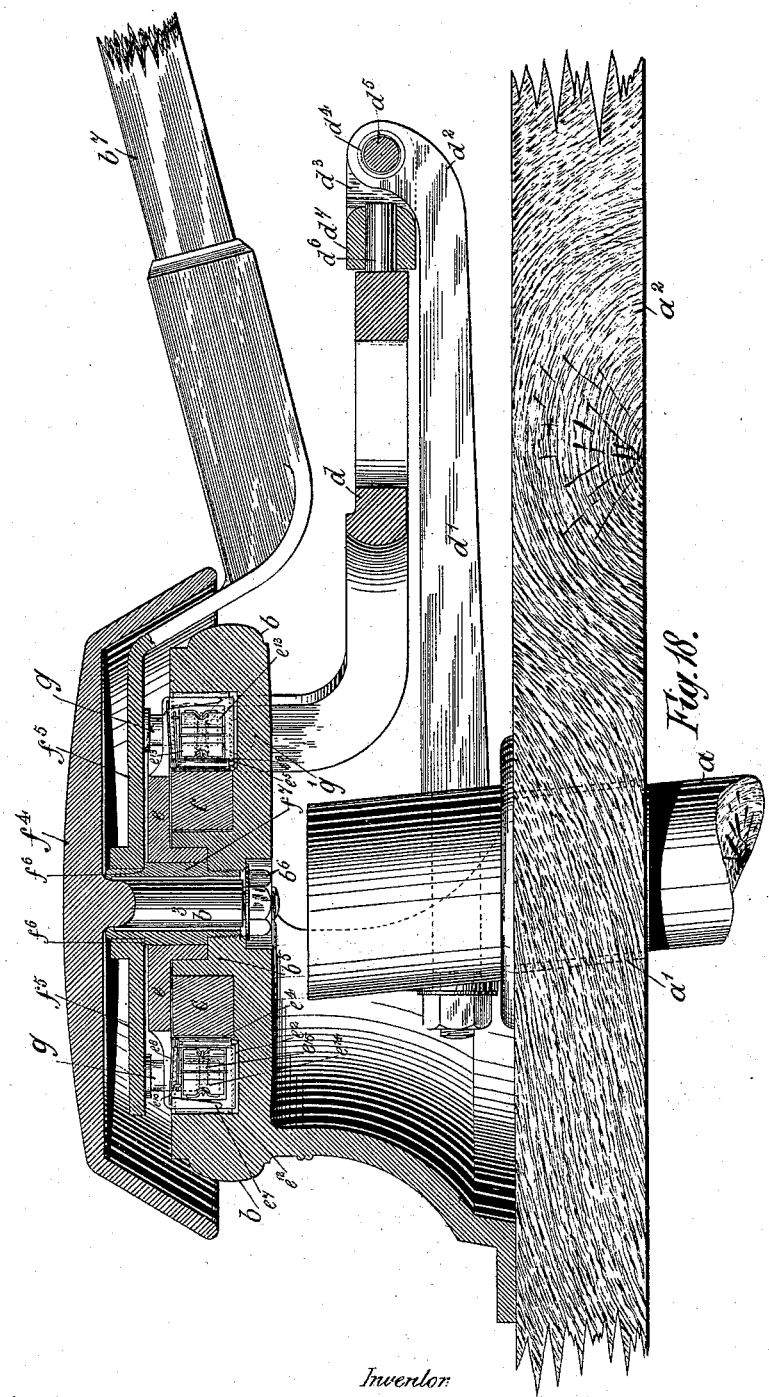
Witnesses:
Chas. S. Woodroffe
Robt. A. Blake
Inventor:
Gennaro Azzeroni,
by Henry H. Leigh
Attorney.

(No Model.) 6 Sheets—Sheet 4.

G. AZZERONI.
STEERING GEAR.

No. 547,317. Patented Oct. 1, 1895.

Witnesses:
Chas. S. Woodroffe
Robt. A. Blake

Inventor:
Gennaro Azzeroni,
by Henry H. Leigh
Attorney.

(No Model.) 6 Sheets—Sheet 5.
G. AZZERONI.
STEERING GEAR.
No. 547,317. Patented Oct. 1, 1895.
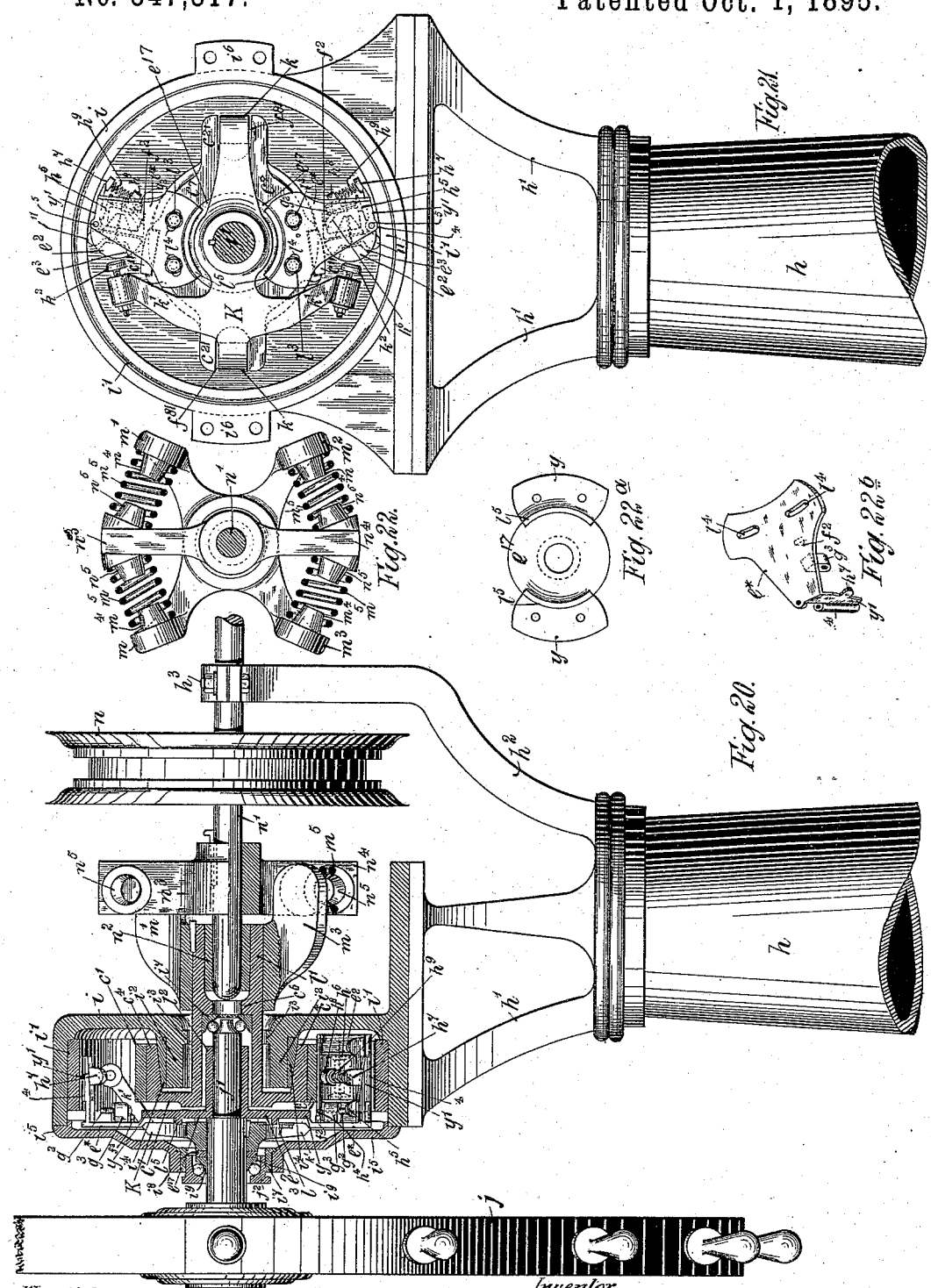
Witnesses:
Chas. J. Woodroffe
Rob' A. Blake
Inventor
Gennaro Azzeroni
by Henry H. Leigh
Attorney (No Model.) 6 Sheets—Sheet 6.

G. AZZERONI.
STEERING GEAR.

No. 547,317. Patented Oct. 1, 1895.

Witnesses:
Chas. S. Woodroffe
Robt. A. Blake

Inventor:
Gennaro Azzeroni
by Henry H. Veigh
Attorney.

UNITED STATES PATENT OFFICE.

GENNARO AZZERONI, OF SOUTHWARK, ENGLAND.

STEERING-GEAR.

SPECIFICATION forming part of Letters Patent No. 547,317, dated October 1, 1895.

Application filed November 22, 1892. Serial No. 452,808. (No model.) Patented in England May 29, 1891, No. 9,124; in Germany July 3, 1891, No. 61,557; in Norway July 4, 1891, No. 2,414; in Belgium July 6, 1891, No. 95,529; in Sweden July 7, 1891, No. 4,354; in Italy September 30, 1891, LIX, 243, and in France October 26, 1892, No. 225,202.

*To all whom it may concern:*

Be it known that I, GENNARO AZZERONI, engineer, a subject of the Queen of the United Kingdon of Great Britain and Ireland, residing at No. 12 Falmouth Road, in the borough of Southwark, in the county of Surrey, England, have invented certain new and useful Improvements in Steering-Gear, (for which I have obtained the following patents: in Great Britain and Ireland, No. 9,124, dated May 29, 1891; in Germany, No. 61,557, dated July 3, 1891; in Belgium, No. 95,529, dated July 6, 1891; in Norway, No. 2,414, dated July 4, 1891; in Sweden, No. 4,354, dated July 7, 1891; in Italy, Vol. LIX, No. 243, dated September 30, 1891, and in France, No. 225,202, dated October 26, 1892;) and I do hereby declare that the following is a full, clear, and exact description of the invention, reference being made to the accompanying drawings, which are to be taken as part of this specification and read therewith, which will enable others skilled in the art to which it appertains to make and use the same.

My invention relates to improvements in steering-gear; and its objects are, first, to provide for the rudder being automatically locked in any position either during the time it is being put over to either port or starboard or afterward; second, to make proper provision for allowing the rudder to yield a little before the shock of a wave or of a swell, and, third, to make the gear capable of gradually absorbing the force of such shock and to practically nullify it, so as to prevent the gear and rudder or either of them being smashed. It can be used in combination with any type of tiller or of steering-gear at present in use, to either of which it is an addition as distinguished from a substitute, and the fitting of it to any such tiller or steering-gear will not involve any alteration in the way in which the latter is worked.

I attain the objects of my invention by the mechanism illustrated in the accompanying drawings, which are to be taken as part of this specification and read therewith.

Figure 23:
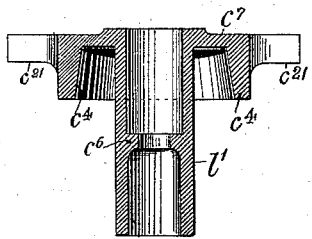
Figure 24:
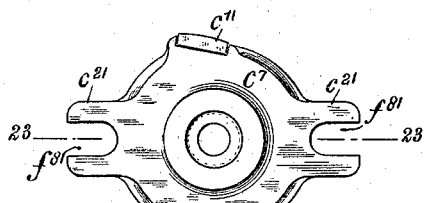
Figure 25:
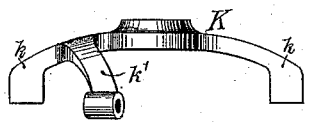
Figure 26:
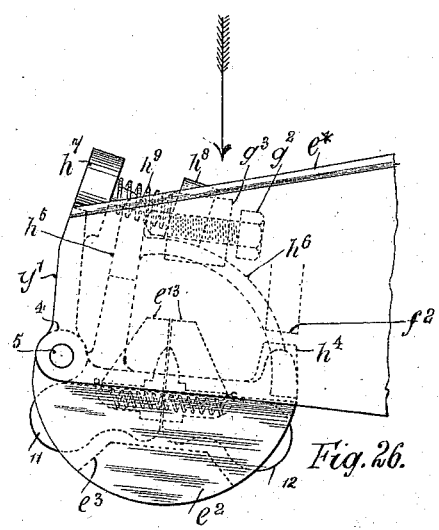
Figure 27:
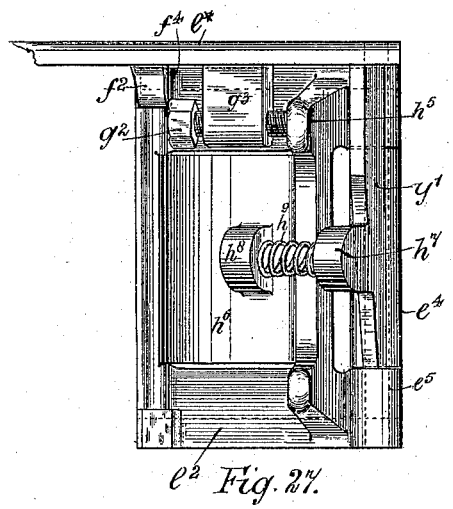

Figure 1 is a sectional elevation taken on the line 1 1 of Fig. 2. It illustrates my invention as adapted to be worked in the horizontal plane of an ordinary hand-tiller. Fig. 2 is a plan corresponding with Fig. 1, but with the left-hand half of the cover removed. Fig. 3 is a plan of the cam and its arms. Fig. 4 is a side elevation thereof. Fig. 5 is a side elevation of the locking device, omitting the left-hand frame and pair of wings. Fig. 6 is a plan of the locking device. Fig. 7 is a rear elevation of a frame. Fig. 8 is a side elevation of one wing. Fig. 9 is a front elevation of a pair of wings. Fig. 10 is a horizontal section of a pair of wings. Fig. 11 is a reversed elevation of Fig. 9. Fig. 12 is a part sectional plan of a pair of wings and the frame on which they are carried. Figs. 13, 14, 15, 16, and 17 illustrate a modified construction of the locking device which is shown in detail in Figs. 6, 7, 8, 9, 10, and 11. Fig. 13 is a plan of the modified locking device. Fig. 14 is a side elevation of one wing. It is taken from the right-hand side of Fig. 15. Fig. 15 is a front elevation of a pair of wings. Fig. 16 is a rear elevation of a frame. Fig. 17 is a reversed elevation of Fig. 15. Fig. 18 is a sectional elevation of a modified form of the invention as the latter is illustrated in Figs. 1 and 2. Fig. 19 is a plan corresponding therewith. Fig. 20 is a sectional side elevation illustrating the application of the same invention to a wheel steering-gear. Fig. 21 is a front elevation of the mechanism illustrated in Fig. 20, taken after the removal of the steering-wheel and drum-cover. Fig. 22 is a sectional front elevation of the connection between the cam and the shaft of the rudder-chain drum, including the cushioning device. Fig. 22$^a$ is a plan of the ring and its extensions of the rudder-locking device. Fig. 22$^b$ is a perspective view of one arm of the rudder-locking device. Fig. 23 is a sectional elevation of the cam. It is taken on the line 23 23 of Fig. 24. Fig. 24 is a plan of the cam. Fig. 25 is a side elevation of the steering-lever. Fig. 26 is a plan of a portion of one arm of the rudder-locking device with its addenda. Fig. 27 is an elevation of Fig. 26, looking at it in the direction of the arrow.

Figs. 3 to 17 are on an enlarged scale compared with Fig. 1, 2, 18, or 19, and Figs. 26 and 27 are on enlarged scale as compared with Figs. 20 to 25.

Referring to Figs. 1 to 12, *a* is the rudder-head. It projects up through the rudder-port $a'$ in the deck $a^2$, as heretofore.

$b$ is a fixed circular box or drum. It is shown as supported above the rudder-head by suitable standards $a^3$, and this is the most appropriate and convenient position for it to occupy; but I do not confine myself in this respect. The internal side of the box, and which is shown as vertical in Figs. 1 to 2, is the operative surface of it. Fig. 1 shows the rudder-head as stopping short of the box $b$; but it may enter it, the plane of the latter being adjusted accordingly, and provide the practical center about which the cam, described farther on, moves.

$b'$ is a circular plate. It is larger than the box $b$ and, having a flange $b^2$ depending from its periphery, is adapted to serve as a cover for the box and to keep the interior of the latter weatherproof. It carries a central boss on its under side, which is produced into a central pin $b^3$. This boss rests upon an anti-friction-ring $b^4$, described farther on, and which provides a seat for the plate $b'$ to turn on.

$b^5$ is a boss standing up centrally from the bottom of the box. It is bored out vertically to receive the pin $b^3$ and to allow the latter to turn freely, but without play, within it. The extremity of the pin is screw-threaded and receives a holding-nut $b^6$, adapted to keep the plate $b'$ down on its seat.

$b^7$ is a hand-tiller. It is made fast to the plate $b'$, from which it radiates, so that as it is moved to and fro in the act of steering the said plate may be turned about its axis accordingly.

The plate $b'$ is the first-motion member of the improvement which forms the subject of the present invention.

$b^8$ $b^8$ are two slots in the flange $b^2$ and diametrically opposite each other. They respectively embrace the arms of the cam next described, but are wider than the said arms for a reason which is explained farther on.

$b^9$ $b^9$ are two studs projecting perpendicularly from the under face of the plate $b'$. These two studs are not diametrically opposite to each other. Their operative faces are aligned parallel with a diameter of the plate and at a short distance from it. The function of these studs is described farther on.

$c$ is a ring provided with two eccentricities constituting it a cam. It is adapted to move about a fixed axis. This axis is shown as provided with the central boss $b^5$, already described.

$c'$ $c'$ are the two eccentricities of the cam, and both trend toward the same side of the ring.

$c^2$ $c^2$ are two arms of equal length. They are aligned with the major axis of the cam, with which latter they are firmly incorporated. Each arm terminates in a pivot $c^3$. The function of these pivots is to establish an operative connection between the cam and the yoke next mentioned.

$d$ is a yoke by means of which, in conjunction with the plate $b'$ already described and the tiller $d'$ described farther on, the cam $c$ and the rudder-head are placed in operative connection. The extremities of the arms of the yoke are bored out to receive the pivots $c^3$ of the cam-arms $c^2$ $c^2$. Any other method of connecting the yoke and cam-arms may be adopted, for I do not confine myself to making the connection between the yoke and cam a pivotal one, inasmuch as it may be a rigid one; but I prefer it to be pivotal in order that the outer end of the yoke may rise and fall, as may be required—for instance, to enable it to follow the motion of the tiller of a raking rudder-head, or when the rudder is suddenly pushed up and down.

The tiller $d'$ is an arm projecting laterally from the rudder-head, to which it is made fast, as heretofore. It lies centrally under the yoke $d$, and its outer end $d^2$ is bent upward until it stands aligned equidistantly between the prongs $d^3$ $d^3$ of a fork upon the end of the yoke $d$, opposite to the connection of the latter with the cam-arms aforesaid. Between each prong of this fork and the tiller end $d^2$ there is interposed a cushioning-spring $d^4$. These springs are shown as of the helical type, but may be of any other possessed of the necessary resilience. They are held in operative position by a bolt $d^5$, which is passed through suitable holes in the prongs of the fork and in the tiller end. It is by means of these springs and the slots $b^8$ $b^8$, already described, that the second and third objects of my invention are attained.

When the rudder-head rakes or inclines aft, as illustrated in Fig. 1, it is self-evident that the tiller $d'$ cannot move in a horizontal plane, but must, when the gear is worked, move in either of two curves, both inclined upward, but in opposite directions from the horizontal or amidships position of the tiller. Now a yoke $d$, rigid from end to end, is capable of only two motions, one in the horizontal plane about the box $b$, and a second one in the vertical plane about the pivots $c^3$. To allow of these two motions—which are at right angles with each other—being merged in a single one inclined at the angle necessary for enabling the above-described fork to move with the tiller end $d^2$, a swivel-joint is introduced into the yoke near the said fork. The function of this joint is to allow of the prongs $d^3$ $d^3$ turning in either direction about a horizontal axis between and parallel with them, and so long as this function is provided for any type of joint may be used. The one illustrated consists of a pin $d^6$, which projects from the yoke and enters a hole bored longitudinally through the boss $d^7$ of the fork, and in which it can move freely about its axis.

The rudder-locking device—and this in combination with the cam and the operative face of the box is the principal feature of my invention—is illustrated in Figs. 1 and 2 and in detail in Figs. 5 to 12. It consists of the following members: $e$ is a loose ring adapted to move easily about the pin $b^3$ and having its seat upon a surface a little above the cam $c$. This surface is shown in Fig. 1 as provided by an antifriction-ring $b^4$, which lies upon the bottom of a cavity in the top of the cam $c$ as well as upon the top of the boss $b^5$. The ring $e$ moves about the same axis as the cover $b'$—i. e., about the pin $b^3$, which passes through a central cavity in the ring.

$e'$ $e'$ are a pair of arms projecting from opposite sides of the ring $e$. The addenda to one arm are counterparts of those to the other, so that a description of one set thereof is a description of both.

$e^2$ is a frame. It is hereinafter called a "carriage." Its top and bottom edges are bent at right angles with it and both of them in the same direction.

$e^3$ is a distance-piece, which is held fast between the said edges. The outer faces of the two distance-pieces are the surfaces with which the operative faces of the studs $b^9$ $b^9$ on the under side of the cover, respectively, engage. The said studs occupy relative positions accordingly. The carriage is pivoted or hinged, by means of a socket $e^4$ on its inner edge, upon a pin $e^5$, depending from the arm in a plane parallel with the side of the box $b$, but stopping short of the bottom of the latter. In point of depth the carriage is less than that of the box, and is prevented from dropping onto the bottom thereof by an enlargement on the end of the pin $e^5$—e. g., a stop-pin $e^6$.

$e^7$ is a stop depending from the end of the arm, and the carriage is normally held up to it by a suitable returning-spring $e^8$. The figures illustrate the use of a crossed-V spring. The eye of it is passed over a pin $e^9$. One of its legs bears upon the outer extremity of the said arm and the other enters an eye $e^{10}$ on the carriage. The spring is then in tension. Within the carriage slides and is also carried the locking-piece. This consists of two leaves of equal size $e^{11}$ $e^{12}$. Their outer edges are adapted to engage, respectively, with the operative surface of the box $b$ and the opposite eccentricity of the cam $c$ for the purpose of locking the rudder. The inner edge of each leaf is rounded off for the purpose of facilitating its motion about its vertical axis (which is close to the said edge) when it is required to unlock the rudder. The direction of this motion is clearly indicated by the dash-and-dot lines in Figs. 10 and 12.

$e^{13}$ $e^{13}$ are a pair of extensions upon the backs of the leaves. $e^{14}$ is a chamber formed in them, and in it lies a spiral spring $e^{15}$, always in tension, and which is adapted to keep the leaves aligned—i. e., in the position illustrated in Figs. 6, 10, and 12—the said extensions acting as stops one to the other. I prefer that the locking-piece should be inclined to the diameter of the ring $e$ in the direction shown in Fig. 2—i. e., with its inner edge to the rear of the outer edge and the latter leading. This position conduces to the production of a more stable locking than would be effected if the locking-piece were normally parallel with a diameter of the ring $e$. The spring $e^{15}$ is a spiral one for the double reason that it is thereby adapted to keep the leaves aligned and that its ends can follow the motion of the leaves about their respective axes. The leaves have no practical axis; but as their rounded adjacent edges roll upon each other they are free to move about the vertical centers of such rounded edges as axes in either direction within the frame. The locking device lies in the box $b$ with the distance-pieces $e^3$ in the direction of the projections of the eccentricities of the cam.

The operation of my invention, constructed as above described, with reference to Figs. 1 to 12 is as follows: Any motion in either direction which may be imparted by the waves to the rudder is communicated through the tiller $d'$ and the yoke $d$ to the cam $c$ and controlled, to the extent of being checked, by one of the cam's eccentricities $c'$, forcing the respective locking-piece outward and wedging it between the said eccentricity and the opposite side of the box $b$. This is why it is impossible for the rudder to be moved in either direction without it being forthwith automatically locked. This condition of being locked is not actually a constant one in the sense that the rudder is locked to the extent of being held motionless all the time. The rudder is not held motionless all the time, for it has a short free motion in either direction, but only until the locking-piece is wedged by the cam's eccentricity. The advantage of this short free motion is that the rudder can yield to some extent before the impact of a wave. The cushioning-springs $d^4$ do much in the way of absorbing the force of a wave or a swell, so that the twisting strains to which the rudder-head is ordinarily subjected are avoided. As the normal condition of the apparatus inside the box $b$ is that of being either locked or on the point of being locked on one side or the other, as has been already explained, it follows that before the rudder can be moved again in the sense of being put over to either port or starboard the particular locking-piece must be rendered inoperative. This is effected in the following way: When the hand-tiller $b^7$ is moved in either direction, one of the studs $b^9$ on the under side of the plate $b'$ is brought to bear upon the respective distance-piece $e^3$ before the slots $b^8$ $b^8$ can come into contact with the cam-arms $c^2$, because the slots are wider than the arms. The slots are wider than the arms in order that the stud in question may bear against the respective distance-piece before the slots bear against the cam-arms. The pressure of the said stud upon the respective distance-piece causes the two leaves of the locking-piece to roll upon their axes, thereby rendering the said piece inoperative by undoing the wedging of the said locking-piece between the eccentricity of the cam and the opposite side of the box. Immediately after the wedging of the locking-piece has been undone the slots $b^8 b^8$ come up to the cam-arms $c^2 c^2$ and through them move the rudder-tiller $d'$. During the time that the rudder is being moved both the cam and the locking device are kept moving, the former by the slots $b^8 b^8$, bearing against the cam-arms $c^2 c^2$, and the latter through one of the studs $b^9$, bearing against the respective distance-piece $e^3$. As soon as the hand-tiller $b^7$ is stopped, the rudder becomes automatically locked by the wedging of one of the locking-pieces in the way already described.

The modifications illustrated in Figs. 13 to 17 are of minor importance and are confined to matters of detail. The top and bottom portions of that edge of each leaf 12 which comes into contact with the cam eccentricity are cut off, as shown at $f f$ in Figs. 14, 15, and 17, while a central notch $f'$ (see Figs. 15 and 17) is cut in that edge of the leaf 11 which comes into contact with the operative surface of the box. The object in diminishing the contacting area of the leaf edges is to prevent any irregularity in the respective surfaces of either the cam eccentricity or of the box standing in the way of the said leaf edges jamming up against them tightly. A moment's consideration will make it clear that the three points or surfaces of restricted area 1 2 3, (see Fig. 15,) being at the angles of a triangle, are certain to jam tightly against the cam and the box even if the surfaces of the latter are irregular. The pin 5, which serves as the pivot on which a carriage $e^2$ turns, is fixed to the arm at a point farther from the center of the apparatus than in the construction before described. According to the modification now under specification, the pivot-pin 5 depends from the outer end of the respective arm. Consequently the socket 4 is on the opposite edge of the carriage. (Compare Figs. 7 and 16.) The stop $e^7$ of the construction before described is replaced by one $f^2$, against which the end of the carriage is returned by the spring next described.

The advantage derived from pivoting the frame at the outer end of the arm instead of at the inner end thereof is that the locking-piece gets away from the cam eccentricity, in the act of unlocking the rudder, more quickly and easily than when the pivot-pin depends from the inner end of the arm.

The crossed-V spring $e^8$ of the construction already described is replaced by a spiral one $f^3$, adapted to discharge the same function. Accordingly one end is made fast to the respective arm and the other to the carriage.

Referring to Figs. 18 and 19, the modifications therein illustrated consist, comparing them with the construction illustrated in Figs. 1 and 2, in (a) the circular plate is inoperative as the first-motion member of the apparatus, that function being discharged by a special disk; (b) the slots are in the cam-arms instead of in the under face of the circular plate; (c) the yoke is pivoted on the circular plate instead of on the arms of the cam; (d) the yoke and tiller are led forward instead of aft.

$f^4$ is the cover of the box $b$. It is held stationary over the box and its contents by the pin $b^3$ and the nut $b^6$.

$f^5$ is a disk. This disk is the first-motion member of the modification now under description, and, in so far, replaces the circular plate $b'$ of Figs. 1 and 2. The hand-tiller $b^7$ is accordingly made fast to it. The latter has its seat on a shoulder $f^6$, formed upon a tube $f^7$, standing up from the bottom of the box $b$ around the central pin $b^3$.

$f^8 f^8$ are slots in the respective cam-arms $c^2$. They are the equivalents of the slots $b^8$ of the before-mentioned construction. It is, therefore, through them that the motion of the hand-tiller $b^7$ is communicated to the said cam by means of studs $f^9 f^9$, depending from the disk $f^5$ and entering the respective slots.

$g\ g$ are a pair of studs. These are the equivalents of the studs $b^9$ of the construction illustrated in Figs. 1 and 2 and, depending from the under side of the disk $f^5$, engage with the respective distance-pieces $e^3$.

It is to be noted that the disk $f^5$, the ring $e$, and the cam $c$ are held a short distance apart by their respective seats to prevent the motion of one being communicated to, or impeding the motion of, the adjoining one by contact between their adjacent faces.

$g'\ g'$ are studs depending from the edge of the cover $f^4$ and projecting beyond it. They form the pivots of the yoke, the shape of which is slightly modified so far as to bend it for the purpose of keeping it out of the way of the hand-tiller. The modified parts are marked with the same reference letters and numerals as in Figs. 1 and 2.

The modifications just described are so immaterial that the practical operation of the invention constructed according to them is the same as described with reference to Figs. 1 to 12. They are illustrated for the purpose of showing how the details of the invention may be varied without departing from its substance or principle.

Referring to Figs. 20 to 27, $h$ is a column upon which the steering-gear is supported.

$i$ is a drum supported in the vertical plane by springers $h'\ h'$, standing up above the column, and to which it is secured in any suitable way.

$h^2$ is a springer, likewise standing up above the same column and having a bearing $h^3$ on the top of it for a purpose described farther on. Both the drum $i$ and the bearing $h^3$ are shown as axially aligned with each other, such axis being horizontal, and this relative position is at once the most convenient and practicable one. The drum $i$ corresponds with the box $b$ of the constructions already described. It and its contents are shown as adapted to work in the vertical instead of in the horizontal plane, which necessitates special provision being made for supporting the several members in their working positions. The operative surface of the drum is provided with a hard-metal lining-ring $i'$, let into the drum.

$i^2$ is a central boss corresponding with the boss $b^5$, already described. It is, like that, hollow in the direction of the axis of the drum, so as to receive the shaft of the steering-wheel as well as the extensions of the ring of the locking device and of the cam and to allow them to turn freely therein.

$i^3$ is a strengthening-ring.

$c^7$ is the cam. The operative members of of it are illustrated in Fig. 24.

$c^{11}$ $c^{11}$ are two eccentricities, both occupying the same relative positions, as before described. They preferably consist of pieces of hardened metal let into the respective sides of the cam.

$c^{21}$ $c^{12}$ are the cam-arms, and $f^{81}$ $f^{31}$ the slots in them. In respect of these slots in the arms and their functions the cam now being described resembles that illustrated in Figs. 18 and 19 and described therewith. Instead of riding upon the bottom of the drum it rides about the periphery of the boss $i^2$ by means of an annular flange $c^4$. The boss is fitted with a hardened metal ring $i^4$ to enable it to resist friction, and the adjacent faces of both it and the flange are tapered to provide for the inevitable wear being taken up. This taking up is effected in the way described farther on. $l'$ is a horizontal tube of a diameter large enough to receive and stand clear of the sleeve $l^2$ of the rudder-locking device described further on. It is axially coincident with the drum $i$ and passes through the boss $i^2$, beyond which it projects for some distance to serve a purpose pointed out hereinafter.

$e^{17}$ is the ring of the rudder-locking device. It is fast to the central horizontal sleeve above mentioned and which is supported upon the shaft $j'$, (described farther on,) about which it can turn freely. The constructional details of this device are much the same as before described and illustrated therewith. The same reference letters and numerals have been used where the details are the same.

The following modifications (see Figs. 22$^a$, 22$^b$, 26, and 27) have been introduced: The arms $e^*$ $e^*$ are made fast to the extensions $y$ $y$ of the ring $e^{17}$ by screws $l^3$, which pass through slots $l^4$ in the arms into the ring. These slots permit of the arms being adjusted in the direction of the respective eccentricity on the cam for the purpose of taking up the wear of the outer edge of a locking-piece.

$l^5$ $l^5$ are circular ridges or distance-pieces upon the ring $e^{17}$. Their function is to serve as guides for the arms $e^*$ $e^*$ as they are being adjusted.

$f^2$ is the stop fast on the under face of the arm, and $h^4$ is an extension of the carriage $e^2$, adapted to bear against the said stop.

$h^5$ is an extension on the same side of the carriage, but near the opposite edge and projecting from it at about a right angle.

$h^6$ is a quadrant extending from the last-mentioned extension to that vertical edge of the carriage which is opposite to the pivot of the latter.

$h^7$ is a lateral enlargement on the depending end $y'$ of the arm, and $h^8$ a block projecting from the quadrant $h^6$. The enlargement $h^7$ and the block $h^8$ are opposite each other. $h^9$ is a spiral spring supported between them in any convenient way. Its function is to return the carriage $e^2$ into its normal position—i. e., with the extension $h^4$ bearing, or nearly so, against the stop $f^2$.

$g^2$ is an adjusting-screw. It works through a fixed stud $g^3$ depending from the arm. The nose of it always stands in the path of the extension $h^5$, so that its position defines the angle which the front of the locking-piece next described makes with a diameter of the rudder-locking device.

$j$ is the well-known steering-wheel, fast upon the projecting end of its shaft $j'$. The latter has its front bearing in the drum-cover $i^5$ and its back bearing in the cam-sleeve. Both bearings are preferably of the ball type. The drum-cover is made fast to the front of the drum $i$ in any suitable way. One method of fixation is indicated in Fig. 21—viz., by screws passed through eyes (not shown in the drawings) projecting from the sides of the cover and entered into lugs $i^6$ on the sides of the drum. The bearings for the shaft $j'$ may be arranged in any convenient way; but I prefer to make them in the way illustrated in Fig. 20, which is as follows: A central opening of a sufficient diameter is made in the drum-cover and a round socket made about it. This receives a lining $i^7$.

$i^8$ is a ring fast upon the shaft $j'$. In front of it is another ring $i^9$.

$j^2$ is a gland. The adjacent faces of the latter and of the ring $i^9$ are turned out to receive balls in the way common to ball-bearings.

$c^6$ is a ring projecting from the internal face of the cam-tube. The inner end of the shaft stands within this ring, and its adjacent surfaces are turned out, so as to produce the back bearing. Provision must be made for setting the gland up into the lining $i^7$, so as to take up wear and tear, especially that between the cam-flange $c^4$ and the ring $i^4$, and this is shown in Fig. 20 as made by forming screw-threads upon the adjacent faces of the gland and the lining. When the gland, therefore, is screwed farther into the lining, the shaft and the cam with it are set in accordingly.

The steering-lever K, through which the motion of the steering-wheel is communicated to the improved gear, is in front elevation something like a T. It corresponds in function to the plate $b'$ of Figs. 1 and 2 and to the disk $f^5$ of Figs. 18 and 19. The two ends $k$ $k$ of the main portion of it are bent at a right angle with it and both in the same direction, so that when it is keyed in the vertical plane upon the shaft $j'$ between the ring $i^3$ and the ring $e^{17}$, and with both its ends equidistant from the said shaft, the said ends will respectively stand in the slots $f^{81} f^{81}$ in the cam-arms $c^{21} c^{21}$, as illustrated in Fig. 21.

$k' k'$ are the steering-arms. They are both fast to the steering-lever, from which they project symmetrically, one from each side. Their outer ends are bent so as to stand, respectively, in front of the distance-pieces $e^3$, already described. Each end is provided with an adjustable push-piece, the function of which is to provide for an adjustment of the position of the operative surface of each end. Such adjustment is necessary (a) if a steering-arm has been finished off too long or too short, or (b) when an arm $e^*$ or $e^*$ has been moved in the direction of a cam eccentricity (or toward its respective steering-arm) to compensate for the wear of the edges of the respective locking-piece. Each push-piece consists of the head of a set-screw $k^2$, the shank of which is received by a correspondingly-threaded hole in the end of the respective steering-arm, through which hole it can be moved backward or forward nearer to or farther from the distance-piece $e^3$.

The steering-lever K is in respect of function the equivalent of the disk $f^5$ of the construction illustrated in Figs. 18 and 19 and described therewith. The ends of the steering-arms $k' k'$—i. e., the push-pieces $k^2 k^2$—correspond with the studs $b^9$ of Figs. 1 and 2 or with those $g$ of Figs. 18 and 19. It is to be noted that the slots $f^{81}$ are wider than the ends of the arms $k$ for the reason already explained in the description of the operation of the gear illustrated in Figs. 1 to 12.

$n$ is the drum, about which the ordinary rudder-chain (not shown in the drawings) is led. Its periphery is of any suitable type or contour adapted to hold the chain as the latter passes about it. The ends of the chain are led away and made fast to the respective ends of the quadrant on the rudder-head. The drum itself is keyed fast on its shaft $n'$. The front bearing of the latter is shown as being provided with a lining $n^2$, fitted for that purpose within the projecting portion of the tube $l'$ already described. If it be preferred or if it be desirable on any ground, this lining is dispensed with. The shaft end will then have sufficient play within the tube to allow it to follow the motion of a raking as distinguished from a vertical rudder-head. Upon the shaft $n'$ and between the cam $c^7$ and the chain-drum $n$ there are fixed two arms $n^3 n^4$. They are of equal length and stand opposite each other and in the same plane. The necessary connection between these arms and the cam $c^7$ is provided by four arms $m\ m'\ m^2\ m^3$. These arms stand at the same angle with each other and are all made fast to the cam $c^7$. This connection is illustrated in Figs. 20 and 22 as consisting of a sleeve in which the four arms meet and which is keyed upon the cam tube $l'$. The four arms are all cranked as much as is necessary to make their outer ends stand right and left of the arms $n^3 n^4$ and at the same radial distance from the shaft $n'$. Thus two arms stand on either hand of one arm $n^3$ or $n^4$. Each of the latter carries on each side of it a tapered projection $n^5$, adapted to serve as the seat of a spiral spring. These projections point, respectively, in the directions in which the shaft $n'$ can move. Upon the end of each of the four arms $m\ m'\ m^2\ m^3$ there is a corresponding projection $m^4$, facing the respective projection $n^5$, thus forming four pairs of projections. Each pair supports a cushioning-spring $m^5$. The arms $n^3 n^4$ are the functional equivalent of the outer end $d^2$ of the tiller $d'$ and the arms $m\ m'\ m^2\ m^3$ those of the prongs of the fork on the end of the yoke $d$ of the constructions illustrated in Figs. 1, 2, 18, and 19 and described therewith. The arms $m\ m^2$ work in conjunction with the (referring to Fig. 22) left side of the arm $n^3$ and the right side of the arm $n^4$ and the arms $m'\ m^3$ with the respectively-opposite sides of the said arms.

The operation of the invention constructed as illustrated in Figs. 20 to 27 is to all intents and purposes the same as already described.

I claim—

1. The combination with the first motion member of a steering-gear, of a pair of studs or push pieces fast to the said member, one on each side of the axis thereof; a fixed drum concentric with the said axis and having its internal circular surface at right angles with the plane in which the said first member is adapted to move; a cam supported concentrically within the said drum, having an eccentricity on each side of it, the two eccentricities being equal and trending in the same direction, the said cam adapted to turn about the axis common to the said first motion member and the drum, with the faces of its eccentricities parallel with the said internal circular surface; a loose connection between the studs or push pieces aforesaid and the respective ends of the said cam, adapted to transmit the motion of either of the former to the respective end of the latter; a connection from each end of the cam to the rudder head, adapted to transmit the motion of either to the other, and an automatic locking device supported between each cam eccentricity and the above mentioned internal circular surface of the fixed drum as well as in the path of the respective stud above mentioned by a plate adapted to hold the said devices opposite to each other, and to rotate within the said drum about the above mentioned common axis.

2. The combination with the first motion member of a steering gear, of a pair of studs or push pieces fast to the said member, one on each side of the axis thereof, both on the same side of a diameter of the said member and having their operative faces aligned with a diameter thereof; a fixed drum concentric with the said axis and having its internal circular surface at right angles with the plane in which the said first member is adapted to move; a cam supported concentrically within the said drum, having an eccentricity on each side of it, the two eccentricities being equal and trending in the same direction, the said cam adapted to turn about the axis common to the said first motion member and the drum, with the faces of its eccentricities parallel with the said internal circular surface; a loose connection between the studs or push pieces aforesaid and the respective ends of the said cam adapted to allow of the operative face of the respective stud or push piece to engage with the locking device and to then transmit the motion of either of the said studs or push pieces to the respective end of the cam; a connection from each end of the cam to the rudder head, adapted to transmit the motion of either to the other, and an automatic locking device supported between each cam eccentricity and the above mentioned internal circular surface of the fixed drum as well as in the path of the respective stud above mentioned by a plate adapted to hold the said devices opposite to each other, and to rotate within the said drum about the above mentioned common axis.

3. The combination with the first motion member of a steering gear, of a pair of studs or push pieces fast to the said member, one on each side of the axis thereof; a fixed drum concentric with the said axis and having its internal circular surface at right angles with the plane in which the said first member is adapted to move; a cam supported concentrically within the said drum, having an eccentricity on each side of it, the two eccentricities being equal and trending in the same direction, the said cam adapted to turn about the axis common to the said first motion member and the drum, with the faces of its eccentricities parallel with the said internal circular surface; a loose connection between the studs or push pieces aforesaid and the respective ends of the said cam, adapted to transmit the motion of either of the former to the respective end of the latter; a connection from each end of the cam to the rudder head having incorporated in it and with it a cushioning device capable of absorbing the force of a wave exerted against either side of the rudder, said connection adapted to transmit the motion of either to the other, and an automatic locking device supported between each cam eccentricity and the above mentioned internal circular surface of the fixed drum as well as in the path of the respective stud above mentioned by a plate adapted to hold the said devices opposite to each other, and to rotate with the said drum about the above mentioned common axis.

4. The combination with the first motion member of a steering gear, of a pair of studs or push pieces, one on each side of the axis thereof; a fixed drum concentric with the said axis; a cam supported concentrically within the said drum and having an eccentricity on each side of it; a loose connection between the studs or push pieces aforesaid and the respective ends of the said cam adapted to allow of the operative face of the respective stud or push piece to engage with the locking device and to then transmit the motion of either of the said studs or push pieces to the respective end of the cam; and an automatic locking device supported between each cam eccentricity and the opposite internal surface of the drum as well as in the path of the respective stud above mentioned by a plate adapted to hold the said devices opposite to each other, and to rotate within the said drum about the above mentioned common axis, and consisting of a pair of leaves each having on one side a stop adapted to engage a corresponding stop on the other, and a spring adapted to draw the two stops together, and a carriage supporting the said leaves aligned radially to the said cam and drum.

In witness whereof I have hereunto affixed my signature, in presence of two witnesses, this 13th day of October, 1892.

GENNARO AZZERONI.

Witnesses:
CHAS. S. WOODROFFE,
THOMAS LAKE.